(12) United States Patent
Renga

(10) Patent No.: US 7,282,892 B2
(45) Date of Patent: Oct. 16, 2007

(54) BATTERY COMPONENT REPLACEMENT

(76) Inventor: Wayne Renga, 427 Sarah Woods Dr., Red Lion, PA (US) 17356

( * ) Notice: Subject to any disclaimer, the term of this patent is extended or adjusted under 35 U.S.C. 154(b) by 0 days.

(21) Appl. No.: 10/933,000

(22) Filed: Sep. 2, 2004

(65) Prior Publication Data

US 2005/0052162 A1    Mar. 10, 2005

(51) Int. Cl.
 H02J 7/00    (2006.01)
 H02M 3/06    (2006.01)
(52) U.S. Cl. .................. 320/166; 104/DIG. 1
(58) Field of Classification Search ........... 320/166, 320/109; 307/109; 105/1.5, 29.2; 446/25, 446/410; 361/301.3
 See application file for complete search history.

(56) References Cited

U.S. PATENT DOCUMENTS

| | | | |
|---|---|---|---|
| 4,914,431 A |   | 4/1990  | Severson et al. |
| 5,448,142 A | * | 9/1995  | Severson et al. ........... 318/280 |
| 5,545,933 A | * | 8/1996  | Okamura et al. ........... 307/109 |
| 5,574,436 A | * | 11/1996 | Sisselman et al. .......... 340/663 |
| 6,433,997 B1| * | 8/2002  | Noguchi et al. ............ 361/511 |
| 6,457,681 B1|   | 10/2002 | Wolf et al. |
| 6,737,764 B2| * | 5/2004  | Mattes ....................... 307/109 |

FOREIGN PATENT DOCUMENTS

WO    WO01/92066    * 12/2001

OTHER PUBLICATIONS

O Gauge Railroading, Run 191, Jan. 2003, 4 pages.
O Gauge Railroading, Run 192, Feb. 2003, 5 pages.
O Gauge Railroading, Run 193, Apr. 2003, 2 pages.
http://rmdtoytrains.org/tips and techniques.htm, Rocky Mountain Division Train Collectors Association, pp. 1-3.
Ted Piunno, Piecing Together The QSI/Proto-Sound Battery Puzzle, pp. 1-4.
http://mth-railking.com/service/p1batt.asp, MTH Electric Trains, Proto-Sound 1 Software/Battery Issues, pp. 1-3.
http://rmdtoytrains.org/tipstechniques/Tip-piunno-12-03.html, Ted Piunno, 9 Volt Batteries, Dec. 17, 2003, pp. 1.
O Gauge Railroading, Run 198, Jan. 2004, 4 pages.
http://rmdtoytrains.org/tipstechniques/Tip-stowell-01-04.html, Ron Stowell, BCR Battery Component Replacement, Jan. 2004, 1 page.
http://rmdtoytrains.org/tipstechniques/Tip-Oursler-01-04.html, Bob Oursler, More on BCR Battery Component Replacement, Jan. 2004, 1 page.
Classic Toy Trains, May 2005, 3 pages.
O Gauge Railroading, Run 210, Oct. 2005, 7 pages.
EBAY, Forever Battery for MTH & Railking protosound trains, Item No. 320059944502, 1 page.
Dallee Electronics Inc., A sampling of items for Your RR from Dallee catalog items, 2 pages.

* cited by examiner

*Primary Examiner*—Karl Easthom
*Assistant Examiner*—Alexis Boateng
(74) *Attorney, Agent, or Firm*—Barley Snyder LLC

(57)    ABSTRACT

A battery component replacement circuit for use in a model railroad application is disclosed. The circuit according to an embodiment of the invention has a series of capacitors connected between positive and negative terminals which supply power for charging the capacitors and which are connected to a load, namely a sound driver and associated processor. A series of diodes is connected in parallel with the series of capacitors also across the terminals. In an alternate embodiment the series of diodes is replaced with a series of resistors.

19 Claims, 1 Drawing Sheet

BATTERY COMPONENT REPLACEMENT

FIELD OF THE INVENTION

The invention is related to model railroad accessories and more particularly to and electronic component for maintaining charge on a model train.

BACKGROUND

Model railroads have a long history of emulating trains and railroad systems throughout the world. Since the earliest model railroad and train systems have been developed, one of the primary goals of model railroaders has been to make the model train experience as realistic as possible for the user. A typical model train has a powered locomotive pulling a series of freight or passenger cars. A locomotive is typically powered by a DC or AC motor which drives one or more axels. The motor is driven by a power supply which applies voltage to the track from a transformer or other variable power source. The power source controls both the amplitude and polarity of voltage so that user may control both speed and direction of the train.

In addition to being able to control the speed and direction of a model train, systems were developed for operating a whistle or a bell located on the train. For example, in AC powered systems, this can be accomplished by applying a DC offset voltage superimposed on the AC voltage applied to the track. In other systems, the train has circuitry that distinguishes between the polarities of DC offset voltage. Thus, for example the whistle or horn would blow when a positive DC offset voltage is applied to the track and a bell would ring when a negative DC offset voltage is applied. These voltages are typically applied by pressing a button located on the power source to affect the desired sound.

More recently, systems have been developed for enhanced sound effects on locomotives in order to give the user a more realistic experience. One such example is marketed by MTH Electric Trains under the trade name Proto-Sound. The original Proto-Sound system offered a wide range of authentic locomotive sounds including: steam chuffing, diesel or electric engine sounds, bell, horn or whistle, locomotive startup and shutdown sounds, cab chatter, passenger station and freight yard sounds, squealing break sounds, air compressor sounds, and steam neutral sounds in addition to maintenance sound effects. This sound system along with lighting controls are typically controlled by a processor, which controls and drives the various component circuits located on the locomotive. The component circuits are located on a printed circuit board and include a light driver circuit, a sound driver circuit, and other driver circuits. Certain sounds for the model train may be stored in a flash memory which is connected to the processor. The processor is capable of retrieving one or more sound files from the flash memory, processing them, and outputting them to the sound system circuit. The sounds may also be stored alternatively on the same integrated circuit as the processor. The processor includes software for operating and processing the sounds. Power is required by the processor and memory in order to maintain, process, and output the sounds. For this purpose, the Proto-Sound system includes a rechargeable battery which provides power to the processor and memory when the track is powered down. Some of these rechargeable batteries take the form of a typical 9-volt battery. Power supply from the track through the power supply circuit during operating intervals serves to recharge the battery.

A problem exists in that these rechargeable batteries, after repeated use and/or long term storage, fail to maintain a proper charge. A low or discharged battery may result in improper shutdown of the sound system and malfunction of the processor. In some instances, improper shutdown may require factory authorized reprogramming to resolve the issues caused by a discharged battery. What is needed is an improved system which would minimize or otherwise alleviate the problems caused by discharged batteries in these locomotive sound systems.

SUMMARY

The invention provides a battery component replacement circuit for use in a model railroad application. The circuit according to an embodiment of the invention has a series of capacitors connected between positive and negative terminals which supply power for charging the capacitors and which are connected to a load, namely a sound driver and associated processor. A series of diodes is connected in parallel with the series of capacitors also across the terminals. In an alternate embodiment the series of diodes is replaced with a series of resistors.

BRIEF DESCRIPTION OF THE DRAWINGS

The invention will now be described by way of example with reference to the accompanying figures of which.

DETAILED DESCRIPTION OF THE EMBODIMENTS

Figure 1:
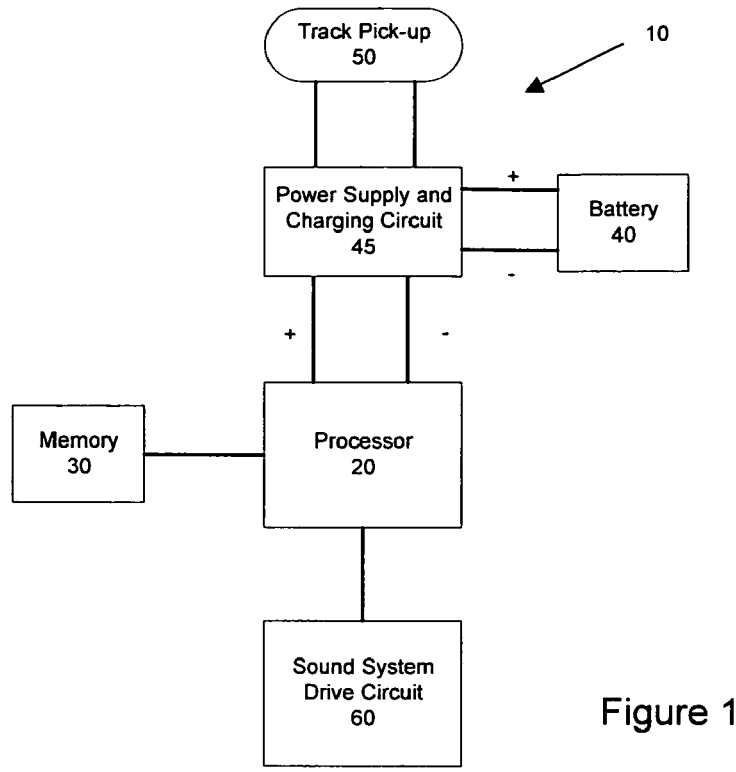
FIG. 1 is a block diagram of an electronic system on board a model train
Figure 2:
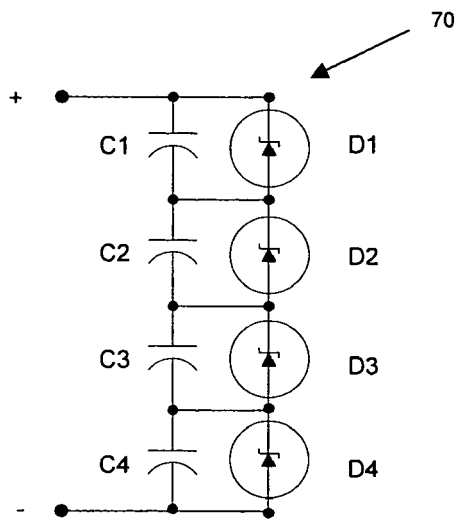
FIG. 2 is a schematic view of first embodiment of a battery component replacement circuit.

One example of an electronic system 10 on board a model train is shown in FIG. 1. Various systems like the one depicted here are commercially available by MTH Trains, Lionel and various other model train manufacturers. The MTH Proto-sound system as described above is one example of such a commercially available system. This figure depicts a processor 20 which is coupled to memory 30 and powered by a power supply and charging circuit 45 coupled to a battery 40 and a track pick-up 50. The track pick-up 50 passes track power from the track as the train moves therealong. It should be understood by those reasonably skilled in the art that the power supply and charging circuit 45 is utilized in AC powered track systems but that it may be replaced with a suitable regulator circuit in a DC powered track system. Also coupled to the processor 20 is a sound system drive circuit 60. It should also be understood by those reasonably skilled in the art that other similar drive circuits for example lighting drive circuits, motor controlled drive circuits, smoke system drive circuits, and coupler drive circuits may also be included in these systems and may be similarly coupled to the processor 20 but have been eliminated here for ease of description. The processor 20 is configured to retrieve selected sounds from memory 30, process them and drive the sound system drive circuit 60 for playing the sounds. Usually, when track power is removed and the train stopped, a power down sound sequence is initiated utilizing battery power. It is therefore necessary for the battery 40 to maintain sufficient power for driving the power down sequence after track power has been removed.

The battery component replacement circuit 70 will now be described in greater detail. The battery component replacement circuit 70 features a plurality of capacitors connected in series, C1, C2, C3, and Ct Each capacitor, C1-C4 has a respective diode D1-D4 connected in series therewith and in series to each other. A positive terminal is connected to the positive terminal of capacitor C1 while a negative terminal is connected to the negative terminal of capacitor C4. The battery component replacement circuit 70 is a direct replacement for the battery 40 shown in FIG. 1.

Figure 3:
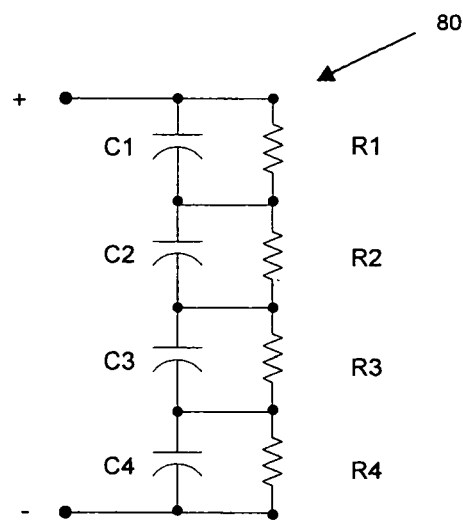
FIG. 3 is a schematic of an alternate embodiment circuit for the battery component replacement of the present invention.

In an alternate embodiment of the battery component replacement circuit 80 shown in FIG. 3, capacitors C1-C4 are also connected in series such that a positive terminal is connected to the positive side of capacitor C1 while a negative terminal is connected to the negative side of capacitor C4. The plurality of diodes is replaced with a plurality of resistors R1-R4 respectively connected across each capacitor C1-C4 and also connected in series to each other. The battery component replacement circuit 80 is also a direct replacement for the battery 40 shown in FIG. 1 Suitable part numbers and values for the capacitors, diodes, and resistors are listed below. It should be understood that these values are exemplary for this embodiment and that other suitable component values could equally perform the functions recited below.

C1-C4: Part Number B1020-2R5335, 3.3 farad, 2.5 volt.
D1-D4: Part Number 1N52235B, 2.7 volt.
R1-R4: 10 KΩ

In operation, the battery component replacement circuit 70, 80 stores charge when power is applied through the track to the positive and negative terminals thereof. The inventor has found that the capacitors C1-C4 will fully charge in approximately one minute when a DC voltage of greater than 10-volts is applied thereto. Upon power down, voltage is removed from the positive and negative terminals from the power source or track, and the capacitors C1-C4 begin to discharge supplying power to drive and shut down the sound system. Considering the amount of power typically drawn by the sound system, an acceptable stored charge after shut down has been found to last for approximately three hours without power from the track. The stored charge is capable of driving the sound system 60 through the start up and the shut down process. The circuit may be housed for example in a standard 9-volt battery case which is a direct replacement for a 9-volt rechargeable battery which may be factory supplied as the battery 40 in FIG. 1. The circuit 70, 80 may alternatively be included elsewhere on the locomotive such as on the power supply and charging circuit 45 board, on the circuit board of the processor 20 or sound system drive circuit 60. Although the battery component replacement circuit is shown here as having a 10-volt output by virtue of the connection of four 2.5-volt capacitors connected in series, other voltage outputs may be achieved by connecting different value and numbers of capacitors in series to achieve the desired voltage output.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A model train system comprising:
 a powered train;
 a power supply and charging circuit being electrically connected to a track system;
 a positive terminal being located on the train and being electrically connected to the power supply and charging circuit;
 a negative terminal being located on the train and being electrically connected to the power supply and charging circuit to complete a drive circuit;
 a processor, memory and sound driver circuit defining a load being electrically connected between the positive and negative terminals; and,
 a circuit having a series of capacitors connected in series with a series of diodes, both series being electrically connected between the positive and negative terminals such that the series of capacitors is charged by power applied from the power supply and charging circuit through the drive circuit and discharged into the load upon removal of power from the track system.

2. The model train system of claim 1 wherein the power supply and charging circuit is connected to the track system through a track pick-up.

3. A model train system comprising:
 a powered train;
 a power supply and charging circuit being electrically connected to a track system;
 a positive terminal being located on the train and being electrically connected to the power supply and charging circuit;
 a negative terminal being located on the train and being electrically connected to the power supply and charging circuit to complete a drive circuit;
 a processor, memory and sound driver circuit defining a load being electrically connected between the positive and negative terminals; and,
 a circuit having a series of capacitors connected in parallel with a series of resistors, both series being electrically connected between the positive and negative terminals such that the series of capacitors is charged by power applied from the power supply and charging circuit through the drive circuit and discharged into the load upon removal of power from the track system.

4. The model train system of claim 3 wherein the power supply and charging circuit is connected to the track system through a track pick-up.

5. The model train system of claim 2 wherein the power supply supplies AC power.

6. The model train system of claim 2 wherein the circuit is housed in a standard battery case.

7. The model train system of claim 2 wherein the circuit is housed on a circuit board of the train's locomotive.

8. The model train system of claim 4 wherein the power supply supplies AC power.

9. The model train system of claim 4 wherein the circuit is housed in a standard battery case.

10. The model train system of claim 4 wherein the circuit is housed on a circuit board of the train's locomotive.

11. A model train system comprising:
 a powered train;
 a power supply and charging circuit being electrically connected to a track system;
 a positive terminal being located on the train and being electrically connected to the power supply and charging circuit;
 a negative terminal being located on the train and being electrically connected to the power supply and charging circuit to complete a drive circuit;

a processor, memory and sound driver circuit defining a load being electrically connected between the positive and negative terminals; and a circuit having a series of capacitors connected in series, each capacitor having a first electrical connection terminal and a second electrical connection terminal and each capacitor having a diode electrically connected across the first electrical connection terminal and the second electrical connection terminal, and the diodes also being connected in series to each other defining a series of diodes, the series of capacitors and the series of diodes each being electrically connected between the positive and negative terminals such that the series of capacitors is charged by power applied from the power supply and charging circuit through the drive circuit and discharged into the load when the power from the track system supplied to the load is insufficient to power the load.

12. The model train system according to claim 11, wherein the series of capacitors and the series of diodes are connected between the positive and negative terminals in an electrically unswitched manner.

13. The model train system according to claim 1, wherein the circuit having a series of capacitors is housed within a standard 9-volt battery case.

14. The model train system according to claim 1, wherein the circuit having a series of capacitors is adapted to directly replace a standard 9-volt battery.

15. The model train system according to claim 1, wherein the circuit having a series of capacitors is housed within a standard 9-volt battery case and is adapted to directly replace a standard 9-volt battery.

16. A model train system comprising:

a powered train;

a power supply and charging circuit being electrically connected to a track system;

a positive terminal being located on the train and being electrically connected to the power supply and charging circuit;

a negative terminal being located on the train and being electrically connected to the power supply and charging circuit to complete a drive circuit;

a processor, memory and sound driver circuit defining a load being electrically connected between the positive and negative terminals; and a circuit having a series of capacitors connected in series, each capacitor having a first electrical connection terminal and a second electrical connection terminal and each capacitor having a diode electrically connected across the first electrical connection terminal and the second electrical connection terminal, and the diodes also being connected in series to each other defining a series of diodes, the series of capacitors and the series of diodes each being electrically connected between the positive and negative terminals such that the series of capacitors is charged by power applied from the power supply and charging circuit through the drive circuit and discharged into the load when the power from the track system supplied to the load is insufficient to power the load.

17. The model train system according to claim 16, wherein the circuit having a series of capacitors is housed within a standard 9-volt battery case.

18. The model train system according to claim 16, wherein the circuit having a series of capacitors is adapted to directly replace a standard 9-volt battery.

19. The model train system according to claim 16, wherein the circuit having a series of capacitors is housed within a standard 9-volt battery case and is adapted to directly replace a standard 9-volt battery.

* * * * *